(12) United States Patent
Salowitz et al.

(10) Patent No.: US 11,134,606 B2
(45) Date of Patent: Oct. 5, 2021

(54) PLANTER ROW UNIT WITH LOAD SENSING DEPTH STOP ASSEMBLY

(71) Applicant: Deere & Company, Moline, IL (US)

(72) Inventors: Jacob D. Salowitz, Bettendorf, IA (US); Michael E. Frasier, Iowa City, IA (US); Pranay Bajjuri, Bettendorf, IA (US); Matt Bartelson, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 188 days.

(21) Appl. No.: 16/296,951

(22) Filed: Mar. 8, 2019

(65) Prior Publication Data

US 2020/0281112 A1 Sep. 10, 2020

(51) Int. Cl.
*A01C 7/20* (2006.01)
*A01C 7/08* (2006.01)

(52) U.S. Cl.
CPC .............. *A01C 7/205* (2013.01); *A01C 7/082* (2013.01); *A01C 7/203* (2013.01); *A01C 7/208* (2013.01)

(58) Field of Classification Search
CPC ......... A01C 7/205; A01C 7/082; A01C 7/203; A01C 7/208; A01C 7/201; A01C 7/20; A01C 7/00; A01C 7/081; A01C 7/08
See application file for complete search history.

(56) References Cited

U.S. PATENT DOCUMENTS

| | | | |
|---|---|---|---|
| 2014/0116735 A1* | 5/2014 | Bassett | A01B 63/008 172/2 |
| 2016/0128263 A1 | 5/2016 | Bassett | |
| 2016/0128265 A1 | 5/2016 | Bassett | |
| 2018/0116098 A1 | 5/2018 | Bassett | |

FOREIGN PATENT DOCUMENTS

| | | |
|---|---|---|
| WO | WO 2008/086283 | 7/2008 |
| WO | WO 2016/073964 | 5/2016 |

OTHER PUBLICATIONS

European Search Report issued in European Patent Application No. 20158765.6 dated Jun. 19, 2020, in 8 pages.

\* cited by examiner

*Primary Examiner* — Christopher J. Novosad
(74) *Attorney, Agent, or Firm* — Michael Best & Friedrich LLP

(57) ABSTRACT

A row unit for a seeding machine includes a frame supporting a gauge wheel and a seed meter. A depth stop assembly includes a stop setting an upward travel limit of the gauge wheel with respect to the frame, and a handle that is lockable and releasable to move the stop to select among seeding depths. A downforce actuator is operable to generate downforce to be applied through a gauge wheel arm and the gauge wheel to the soil. A downforce sensor is incorporated into the depth stop assembly and movable therewith. The depth stop assembly includes a multi-piece body having a first piece receiving the handle, and a second piece defining a pivot. The first piece of the multi-piece body includes a (Continued)

handle-receiving receptacle portion, a fastening portion for fastening to the second body piece adjacent the pivot, and a portion therebetween forming a housing of the downforce sensor.

20 Claims, 7 Drawing Sheets

US 11,134,606 B2

PLANTER ROW UNIT WITH LOAD SENSING DEPTH STOP ASSEMBLY

BACKGROUND

The present disclosure relates to systems and methods for planting seeds, in particular with a row unit for a seeding machine.

Various factors affect crop yields. One factor, for example, is seed depth in a furrow. Another factor is soil compaction along the furrow. A productive crop yield is typically one that grows and emerges uniformly from the soil. Understanding planting depth and soil compaction provides valuable information that may be used to generate a productive crop yield.

SUMMARY

In one aspect, the disclosure provides a row unit for a seeding machine operable to plant seeds into soil. The row unit includes a frame, a gauge wheel operable to engage the soil and support the frame via a gauge wheel arm connected between the gauge wheel and the frame, and a seed dispenser supported by the frame and operable to dispense seeds into the soil. The gauge wheel is supported by the frame via a gauge wheel arm. A depth stop assembly includes a stop setting an upward travel limit of the gauge wheel with respect to the frame, and a handle that is lockable and releasable to move the stop to select among a plurality of seeding depths. A downforce actuator is operable to generate a variable amount of downforce to be applied through the gauge wheel arm and the gauge wheel to the soil. A downforce sensor is incorporated into the depth stop assembly and movable therewith. The depth stop assembly includes a multi-piece body having a first piece receiving the handle, and a second piece defining a pivot joining the depth stop assembly to the frame. The first piece of the multi-piece body includes a handle-receiving receptacle portion, a fastening portion for fastening to the second piece of the multi-piece body adjacent the pivot, and a portion between the handle-receiving receptacle portion and the fastening portion forming a housing of the downforce sensor.

In another aspect, the disclosure provides a row unit for a seeding machine operable to plant seeds into soil. The row unit includes a frame, a gauge wheel operable to engage the soil and support the frame via a gauge wheel arm connected between the gauge wheel and the frame, and a seed dispenser supported by the frame and operable to dispense seeds into the soil. The gauge wheel is supported by the frame via a gauge wheel arm. A depth stop assembly includes a stop setting an upward travel limit of the gauge wheel with respect to the frame, and a handle that is lockable and releasable to move the stop to select among a plurality of seeding depths. A pivot joins the depth stop assembly to the frame. A downforce actuator is operable to generate a variable amount of downforce to be applied through the gauge wheel arm and the gauge wheel to the soil. A downforce sensor is provided by a load cell including at least one strain gauge. The load cell is offset from the stop and positioned on an opposite side of the pivot from the stop.

In yet another aspect, the disclosure provides a seeding row unit depth stop assembly including a stop, a handle, and a multi-piece body. The stop presents a surface positioned to set an upward travel limit of a gauge wheel of the row unit. The handle is movable between locked and released positions, the depth stop assembly having a pivot for moving among a plurality of seeding depths when the handle is in the released position. The multi-piece body has a first piece receiving the handle, and a second piece separate from the first piece, the second piece defining the pivot. A downforce sensor is incorporated into the depth stop assembly and movable therewith. The first piece forms a housing of the downforce sensor. The downforce sensor is offset from the stop and positioned on an opposite side of the pivot from the stop.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
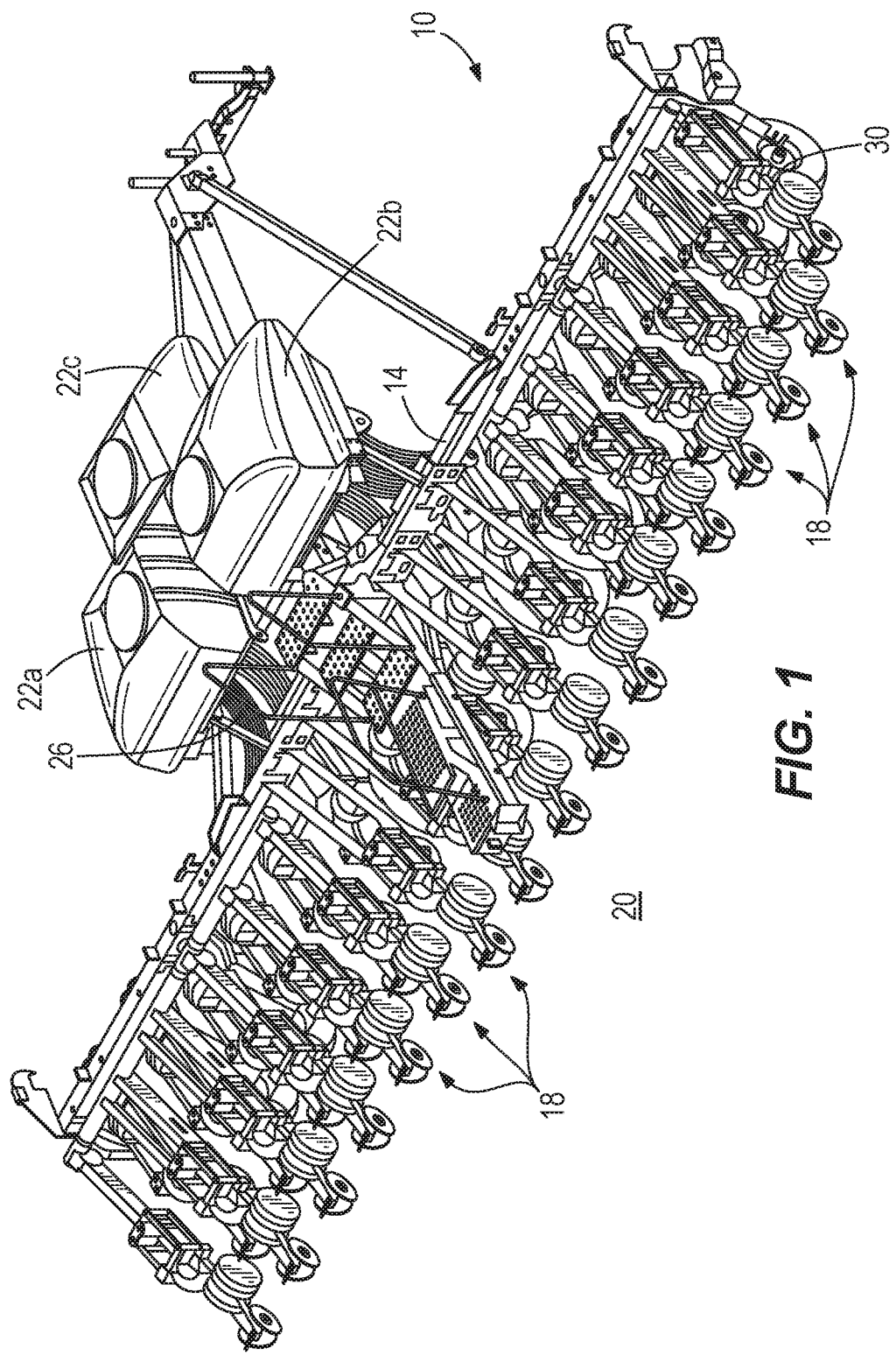
FIG. 1 is a perspective view of a seeding machine.

FIG. 1 illustrates a seeding machine 10 (e.g., a row crop planter). The seeding machine 10 includes a main frame 14. A plurality of individual row units 18 are coupled (e.g., mounted) on a rear portion of the main frame 14, such that the row units 18 are pulled over or across a layer of soil 20. Alternatively, the row units 18 may be positioned forward of the frame 14 and pushed over or across the soil layer 20, or the machine may have a combination of push and pull row units 18. Seed sources, such as storage tanks 22a-22c, are coupled to the main frame 14 and hold seed that is delivered, e.g., pneumatically or in any other suitable manner, to a mini-hopper (not shown) associated with each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated by way of example only in FIG. 1, each row unit 18 further includes its own sub-frame 30, to which various components (e.g., a furrow opener, a furrow closer, etc.) are mounted.

Figure 2:
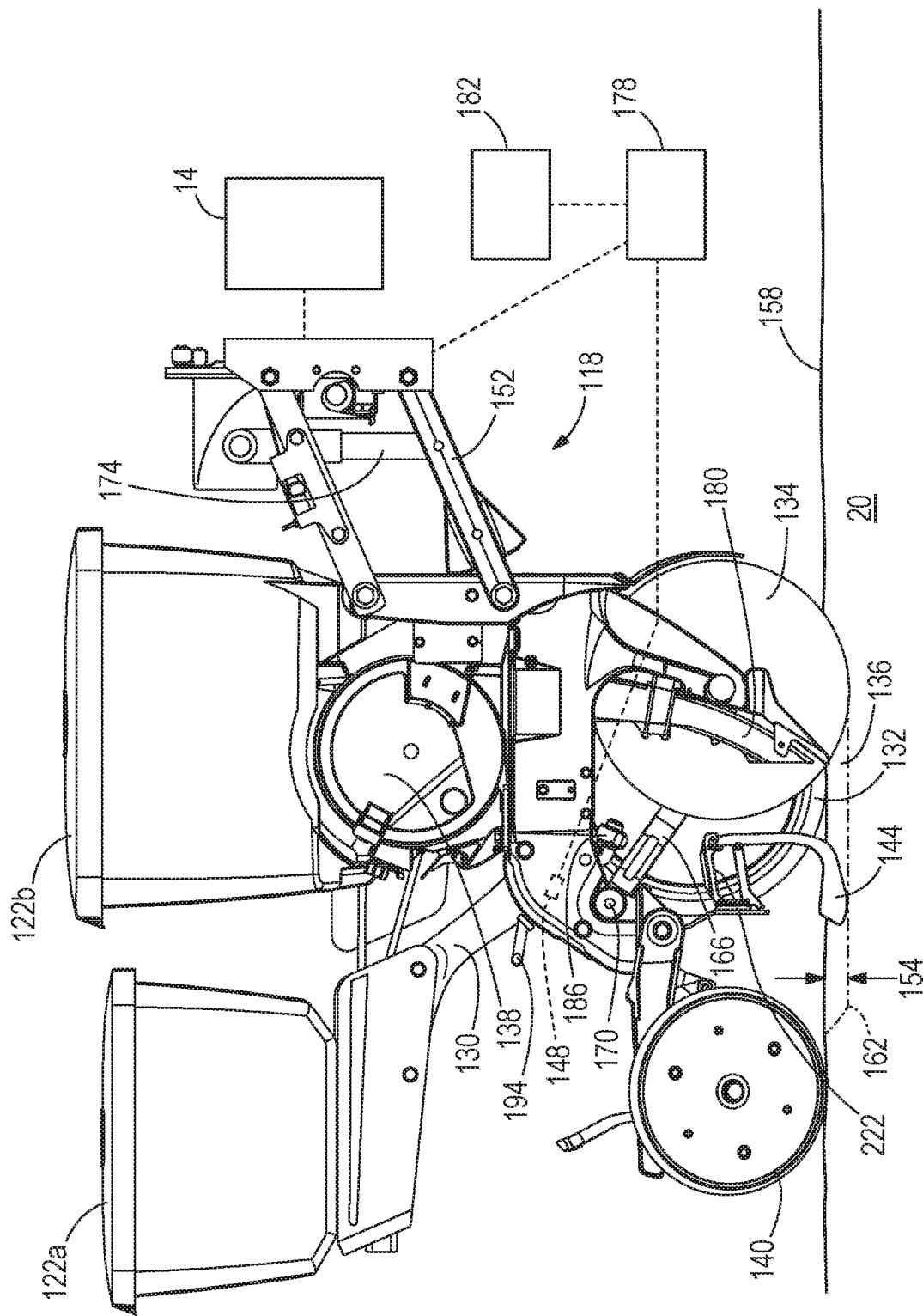
FIG. 2 is a partially schematic side view of a row unit of the seeding machine of FIG. 1, including gauge wheel arms and gauge wheels.

FIG. 2 illustrates an example of a row unit 118 that may be used in place of any one or more of the row units 18 in FIG. 1. Similar to the row unit 18, the row unit 118 is also coupled to the main frame 14. In some constructions, a plurality of row units 118 are coupled to the main frame 14, similar to the row units 18 in FIG. 1. As illustrated in FIG. 2, each row unit 118 includes hoppers 122a, 122b, which hold chemical and seed, respectively (as opposed to the row unit 18 receiving seed from bulk storage as in the construction illustrated in FIG. 1). The hoppers 122a, 122b are coupled to a row unit sub-frame 130. Each row unit 118 also includes a gauge wheel or wheels 132 coupled to the row unit sub-frame 130. The gauge wheel 132 contacts and rolls along the soil 20, and a furrow opener 134 (e.g., an opening wheel or blade or other structure having a stationary or rotating surface that contacts and moves soil away to form a furrow) is coupled to the row unit sub-frame 130 for forming a furrow 136 (illustrated schematically) in the soil 20. A seed metering device 138 coupled to the row unit sub-frame 130 receives seeds from the hopper 122b and meters and dispenses the seeds into the furrow 136. A furrow closer 140 (e.g., a closing and packing wheel or wheels or other structure having a stationary or rotating surface that contacts and presses soil 20) coupled to the row unit sub-frame 130 pushes soil around the seeds to close the furrow 136 (see FIG. 1). Each row unit 118 may also include a seed firmer 144 (e.g., an angled arm as illustrated in FIG. 2, a press wheel coupled to a press wheel arm, or other structure that firms a seed) coupled to the row unit sub-frame 130 that firms each seed and pushes it into the open furrow 136 to ensure good seed to soil contact before the furrow 136 is closed. FIG. 2 also illustrates an optional coulter wheel 22 and row cleaner 23 forward of the furrow opener 134.

The row unit 118 also includes a downforce adjustment mechanism 174 coupled to the main frame 14 and to the row unit sub-frame 130. The downforce adjustment mechanism 174 includes springs, pneumatics, hydraulics, linkages, and/or other structures forming an actuator such that when the downforce adjustment mechanism is activated, the downforce adjustment mechanism 174 pushes the row unit sub-frame 130 of the row unit 118 and consequently the furrow opener 134 into the soil 20 to dig the furrow 136. The gauge wheels 132, however, continue to ride along the top surface 158 of the soil 20. Active downforce control can be provided by the combination of the downforce adjustment mechanism 174, particularly the actuator thereof, along with a downforce sensor 148 and a controller 178 as discussed in further detail herein. A depth 154 of the furrow 136 is measured from a top surface 158 of the soil 20 to the bottom 162 of the furrow 136, along a direction that is perpendicular to the top surface 158 (assuming a flat, non-inclined top surface 158), and therefore depends on a position of the gauge wheels 132 relative to the furrow opener 134. In some constructions, the depth 154 is equivalent to a distance between a bottom of the gauge wheel or wheels 132 and a bottom of the furrow opener 134. The downforce adjustment mechanism 174 is mounted on a coupling assembly 150 that couples the row unit 118 to the main frame 14. In the example shown in FIG. 2, a rod of the actuator forming the downforce adjustment mechanism 174 is coupled to a link of a parallel linkage 152 and is used to exert downward force on the row unit 118 through the parallel linkage 152.

Figure 3:
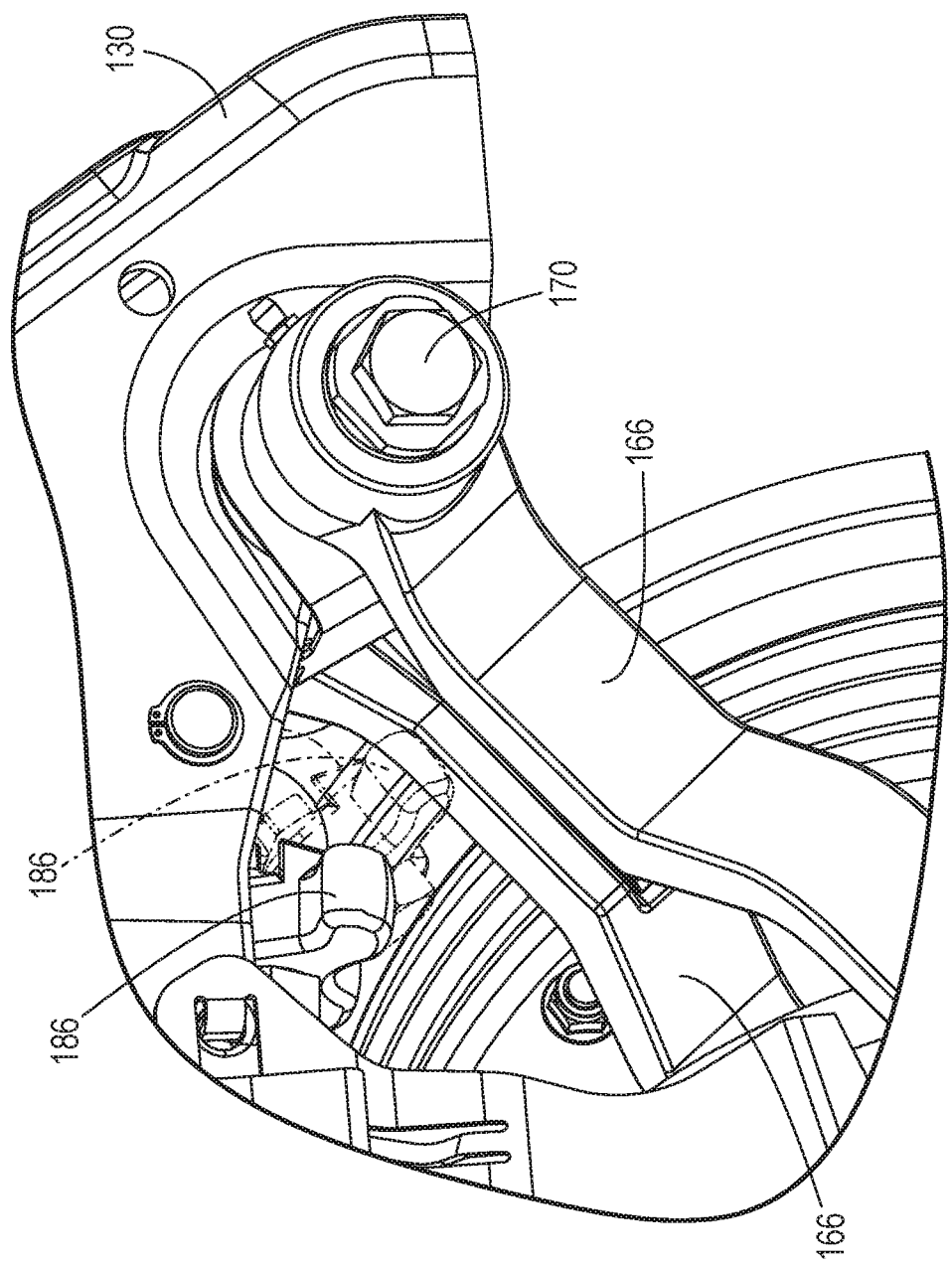
FIG. 3 is a perspective view of a pair of gauge wheel arms and a limiting stop of the row unit of FIG. 2.

With continued reference to FIGS. 2 and 3, the gauge wheel(s) 132 are coupled to the sub-frame 130 with respective arms 166 and respective pivots 170, which can be concentric as shown. Stops 186 are also provided on the row unit 118 for each gauge wheel arm 166 to limit the upward rotation of each gauge wheel arm 166. The stops 186 are adjustable to a desired position to set the depth 154 of the furrow 136. The position of the stops 186 can be manually adjusted or a remote adjustment assembly may be included such as shown in U.S. Pat. No. 4,413,685, the entire contents of which are incorporated herein by reference. The stops 186 form part of a depth stop assembly 190, which is shown in further detail in FIG. 4. In particular, the stops 186 can be provided as a rocker member, which has two discrete stop surfaces for the two gauge wheel arms 166, pivotably supported on the depth stop assembly 190 at a first or inner end thereof. At a second end opposite the stops 186, the depth stop assembly 190 includes a handle 194 that is lockable and releasable, e.g., in various notches 196 on the sub-frame 130, to select among a plurality of seeding depths, each setting positioning the stops 186 at a different height with respect to the sub-frame 130. The depth stop assembly 190 is coupled to the sub-frame 130 with a pivot 200 that allows movement among the plurality of settings when the handle 194 is released. The pivot 200 can be parallel to and offset from the concentric pivots 170 of the gauge wheel arms 166. The handle 194 can be biased to the locked position by a biasing member 204, such as a coil spring.

Figure 5:
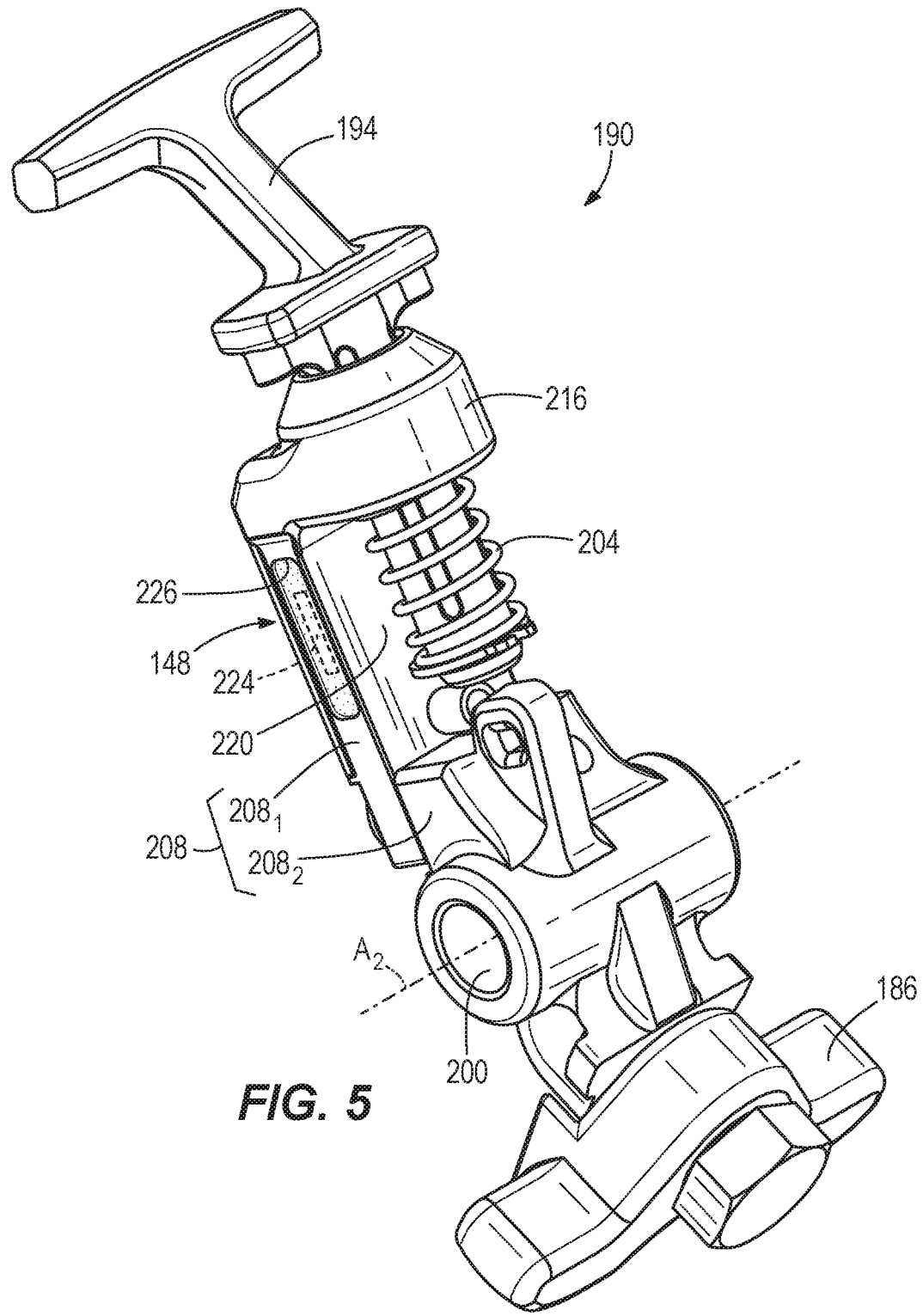
FIG. 5 is a first perspective view of the depth stop assembly of FIG. 4.
Figures 6, 7:
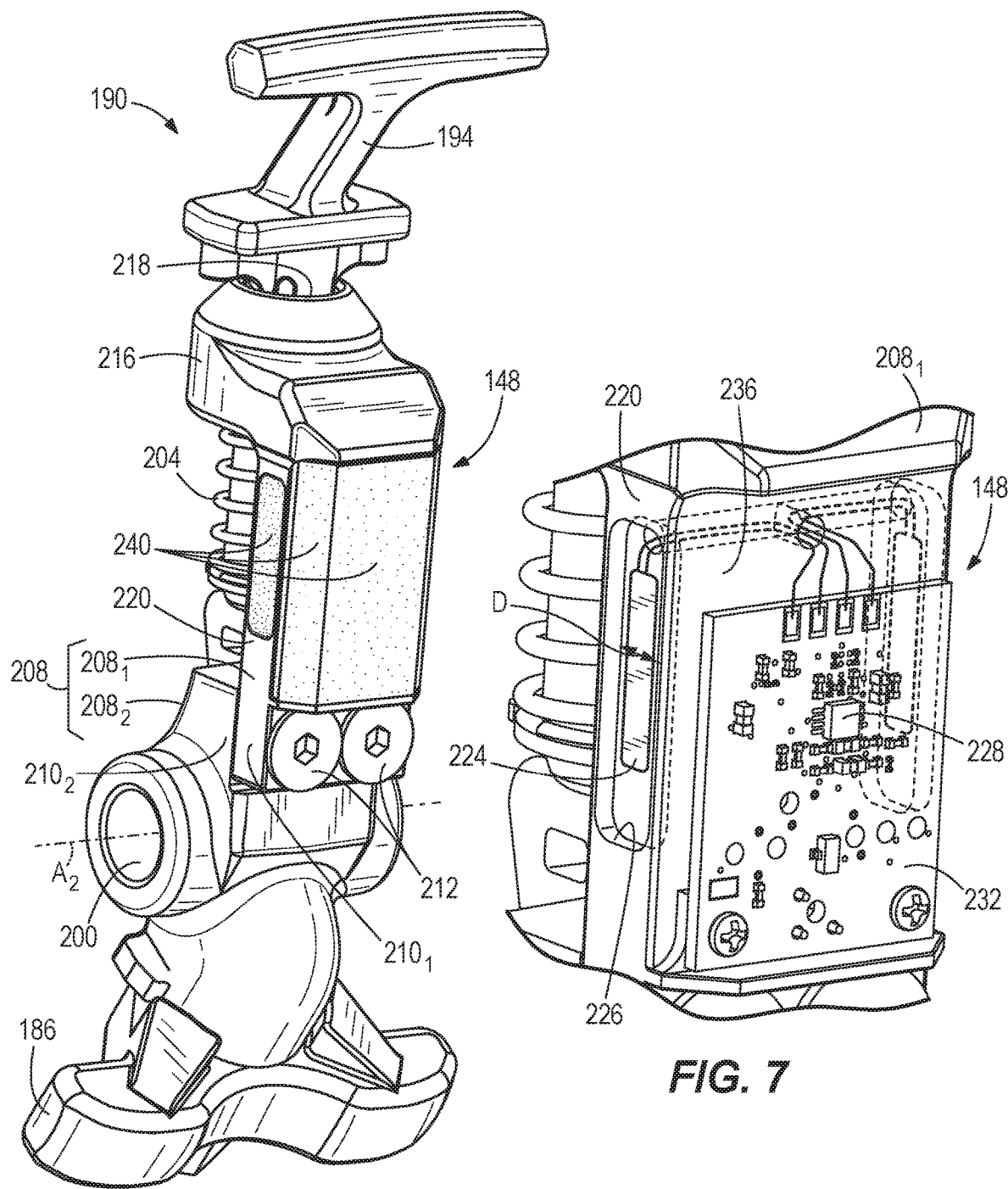
FIG. 6 is a second perspective view of the depth stop assembly of FIGS. 4 and 5.
FIG. 7 is a perspective view of the depth stop assembly with potting compound removed from the downforce sensor housing.

The depth stop assembly 190, which is shown in further detail in FIGS. 5-7, includes a multi-piece body 208 having a first piece 2081 receiving the handle 194, and a second piece 2082 defining the pivot 200 joining the depth stop assembly 190 to the sub-frame 130. The first and second pieces 2081, 2082 of the multi-piece body 208 are separate from each other and connected by respective fastening portions 2101, 2102 thereof. As illustrated, the first and second body pieces 2081, 2082 are fastened with a pair of threaded fasteners 212, although other fastener arrangements can be used. Within the first body piece 2081, there is defined a handle-receiving receptacle portion 216, which is opposite the fastening portion 2101 as illustrated. In the illustrated construction, the handle-receiving receptacle portion 216 is formed as a ring or loop defining an aperture 218 that receives a portion of the handle 194. The handle 194 is thereby slidably received to define a handle axis $A_1$ along which the handle 194 is movable between its locked and released positions. Between the fastening portion 2101 and the handle-receiving receptacle portion 216 an additional portion of the first body piece 2081 forms a housing 220 of the downforce sensor 148.

The row unit downforce sensor 148 is one of one or more such sensors on the row unit 118 operable to sense the downforce on the row unit 118. The illustrated downforce sensor 148 is incorporated or integrated into the depth stop assembly 190 and movable therewith. The downforce sensor 148 is offset from the stops 186 and positioned on an opposite side of the pivot 200 from the stops 186. The downforce sensor 148 extends parallel to the handle axis $A_1$ at a position alongside the handle 194. The downforce sensor 148 can be provided as a load cell including at least one strain gauge 224. As illustrated, the downforce sensor 148 includes two strain gauges 224. Each of the strain gauges 224 is oriented to measure perpendicular to the handle axis $A_1$, along measurement direction D (both of which are perpendicular to an axis $A_2$ of the depth stop assembly pivot 200). The strain gauges 224 can be used in combination to provide a combined output signal from the downforce sensor 148 (e.g., one strain gauge as a primary and the other as a confirmation, or alternatively measurements from the two strain gauges can be averaged). The downforce sensor housing 220 provided by the first body piece 2081 includes a receptacle 226 or recess therein (e.g., along opposite side edges thereof) for each of the strain gauges 224 so that the strain gauges 224 are set into the housing 220 and not exposed or protruding therefrom. The downforce sensor 148 can also include a processor (e.g., a microprocessor) 228 coupled to the strain gauges 224 through wired or wireless connections so that signals representative of strain, and thus force or load, can be generated by the downforce sensor 148. For example, electrical resistance changes can be monitored by the processor 228 onboard the downforce sensor 148, and the electrical resistance changes can be calibrated to mechanical properties of the material forming the first body piece 208₁. The processor 228 can be provided on a circuit board 232 that is at least partially received in a receptacle 236 or recess in the housing 220. Any or all of the receptacles 226, 236 receiving the strain gauges 224 and the circuit board 232 can be at least partially filled with potting compound 240 that encases (e.g., molds around) the strain gauges 224 and/or the circuit board 232, including the processor 228. The downforce sensor 148 is shown without the potting compound 240 in FIG. 7.

Figure 4:
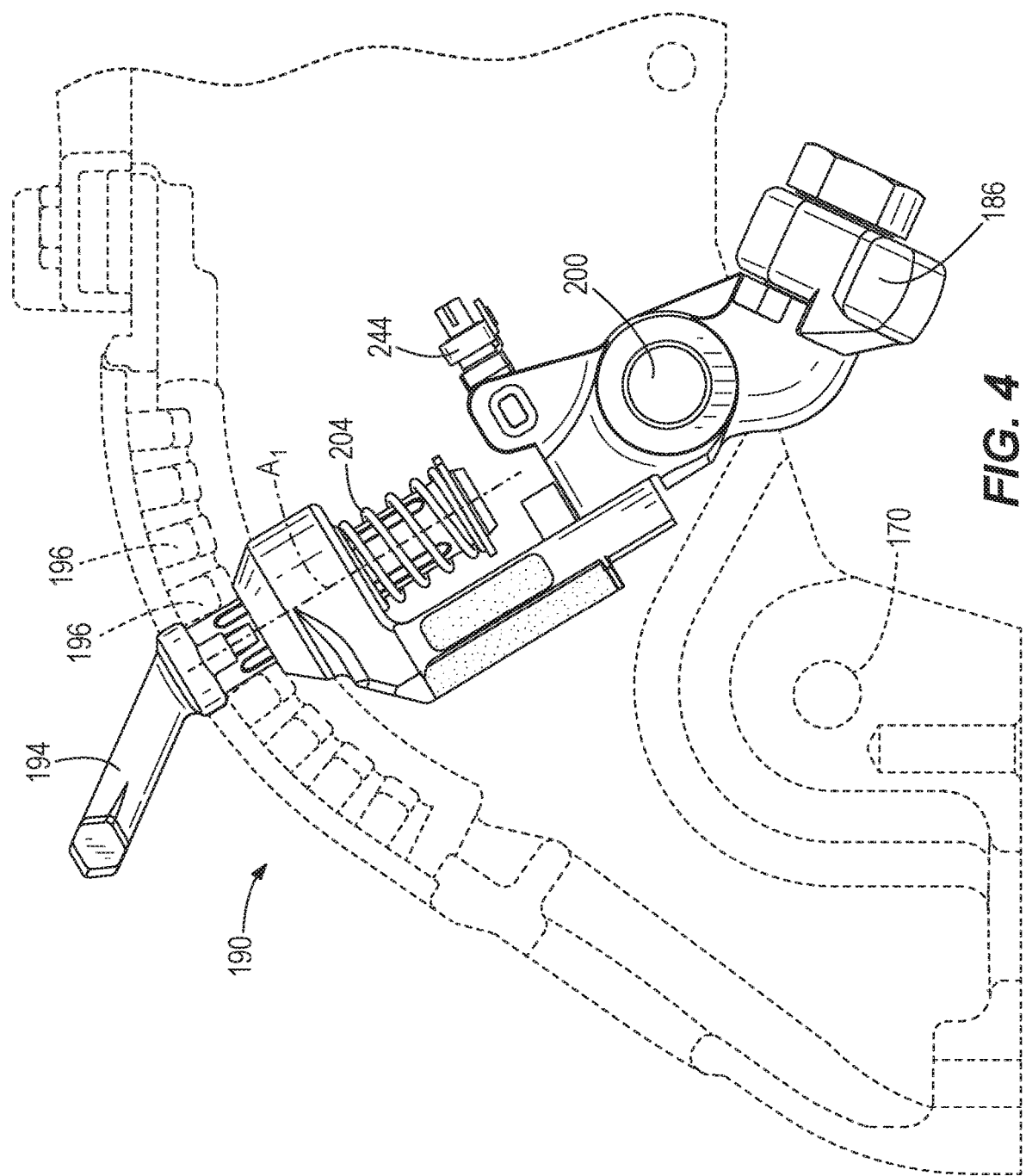
FIG. 4 is a side view of a portion of the row unit of FIG. 2, including a depth stop assembly with an integrated downforce sensor.

As shown in FIG. 4, an electrical connector 244 establishes communication between the downforce sensor 148 and the controller 178. For example, the electrical connector 244 can be a multi-pin plug-type connector and may form one half of a mating male-female junction. The electrical connector 244 is supported by the second piece 208₂ of the multi-piece body 208 that defines the pivot 200 and not by the first piece 208₁ that receives the handle 194. For example, the electrical connector 244 may snap into or onto the second piece 208₂, or it may be secured with a fastener, including a threaded fastener or a strap, a clip, etc.

Referring again to FIG. 2, signals from the downforce sensor 148 are sent to the controller 178, which tracks and/or actively manages the row unit downforce via manipulation of the downforce adjustment mechanism 174. The controller 178 (which may include a memory and a processor for receiving and sending signals and performing calculations) uses the received signals to activate and/or adjust (i.e., increase or decrease) an output of the downforce adjustment mechanism 174 and to thus control an overall downforce applied to the row unit 118. As discussed earlier, the downforce sensor 148 can include an on-board processor 228, and the downforce signals can be provided to the controller 178 from the on-board processor 228. For example, the on-board processor 228 can perform preliminary signal conditioning of the actual measurement parameter signals (e.g., variable electrical resistance) from the strain gauges 224. This is not, however, required in all constructions, and raw measurement signals can be output from the strain gauge(s) 224 to the controller 178 located outside of the downforce sensor 148. The controller 178 can be dedicated to the singular row unit 118 or may be a centralized controller of the seeding machine 10 that receives downforce signals and manages the applied downforce of a group of row units 118. For example, the controller 178 can independently manage up to all of the row units 118 (e.g., on a plurality of separate channels, calculating and outputting separate downforce control signals) based on the independent signals from the independent row unit downforce sensors 148 thereof.

Figure 8:
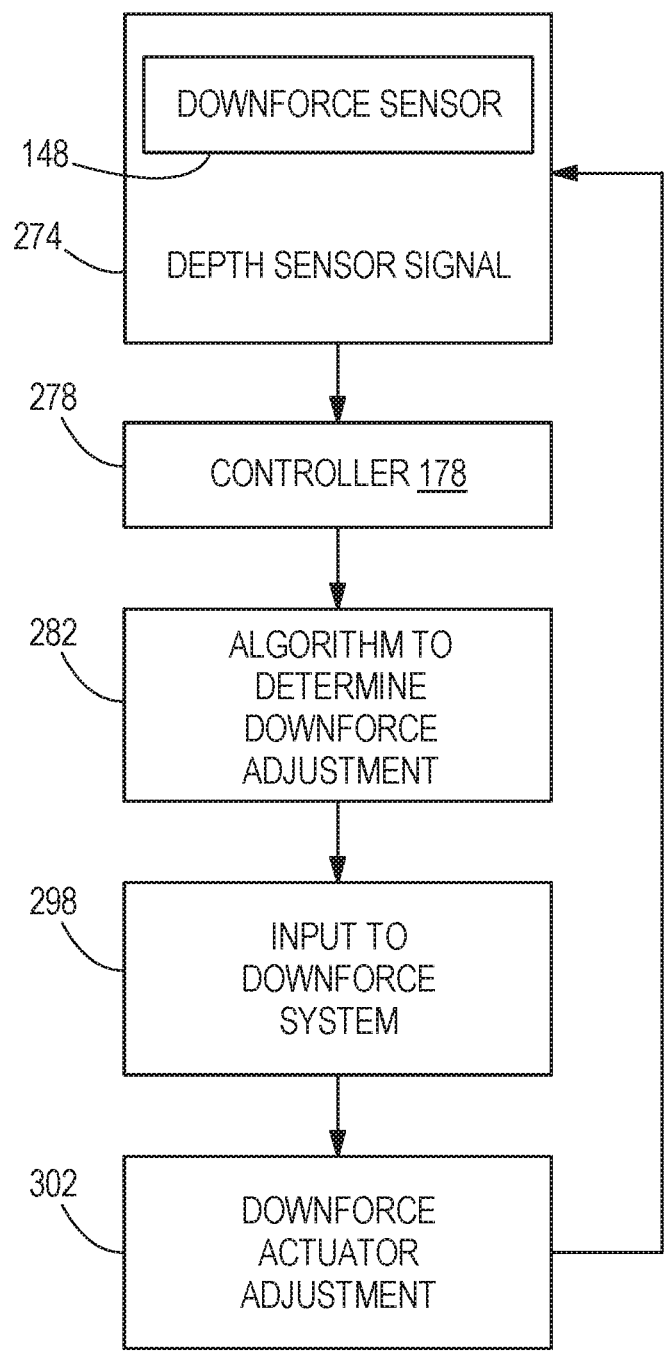
FIG. 8 is a flowchart illustrating a process for using a downforce sensor in closed-loop downforce control.

FIG. 8 illustrates one exemplary method of controlling downforce. In a first step 274, the downforce sensor 148 initially generates signals. In a second step 278, the controller 178 receives the signals from the downforce sensor 148 (e.g., wirelessly or with a wired connection). In a third step 282, the controller 178 uses an algorithm to determine a downforce adjustment for the row unit 118. In some constructions, the algorithm is based solely on the difference between actual and target downforce values and may perform calculations that take into account instantaneous downforce, downforce consistency, a moving average, a trend, etc. In some constructions, the algorithm additionally considers one or more additional parameters such as furrow depth, GPS location, soil moisture, soil type, speed of the seeding machine 10 through the field, etc. Information of this type can be measured from one or more additional sensors of the seeding machine 10 and/or the row unit 118. Alternatively or additionally, such information can be input by a human operator to the controller 178, for example from a control interface in an operator cabin.

When the controller 178 determines that there is insufficient downforce, in response through a fourth step 298 the controller 178 sends a signal to the downforce adjustment mechanism 174, and in a fifth step 302 the downforce adjustment mechanism 174 is activated and adjusts (i.e., increases) the downforce on the row unit 118. The increased downforce can assist in achieving a more consistent furrow depth, for example. As illustrated in FIG. 8, once the downforce has been adjusted, the process repeats, such that the controller 178 is continuously receiving signals from the downforce sensor 148 and is continuously making adjustments to the downforce as needed (i.e., creating a closed loop). As mentioned above, this can occur simultaneously for a plurality of row units 118, each having separate downforce adjustment mechanisms 174. Alternatively, when the controller 178 determines there is excess downforce at step 282, then in response through a fourth step 298 the controller 178 sends a signal to the downforce adjustment mechanism 174, and in a fifth step 302 the downforce adjustment mechanism 174 is activated and adjusts (i.e., decreases) the downforce on the row unit 118.

The downforce control as described above can be carried out in a closed loop automated manner via the controller 178 without ongoing operator interaction. Alternatively, in some constructions, the measured downforce may be displayed to an operator (e.g., on a visual display), and the operator may respond by making adjustments to the downforce and/or travel speed of the seeding machine 10 as desired based on the displayed information.

Following are several clauses describing various embodiments and concepts disclosed herein:

Clause 1. A row unit for a seeding machine operable to plant seeds into soil. The row unit includes a frame, a gauge wheel operable to engage the soil and support the frame via a gauge wheel arm connected between the gauge wheel and the frame, and a seed dispenser supported by the frame and operable to dispense seeds into the soil. The gauge wheel is supported by the frame via a gauge wheel arm. A depth stop assembly includes a stop setting an upward travel limit of the gauge wheel with respect to the frame, and a handle that is lockable and releasable to move the stop to select among a plurality of seeding depths. A downforce actuator is operable to generate a variable amount of downforce to be applied through the gauge wheel arm and the gauge wheel to the soil. A downforce sensor is incorporated into the depth stop assembly and movable therewith. The depth stop assembly includes a multi-piece body having a first piece receiving the handle, and a second piece defining a pivot joining the depth stop assembly to the frame. The first piece of the multi-piece body includes a handle-receiving receptacle portion, a fastening portion for fastening to the second piece of the multi-piece body adjacent the pivot, and a portion between the handle-receiving receptacle portion and the fastening portion forming a housing of the downforce sensor.

Clause 2. The row unit of clause 1, further comprising a controller programmed to output a control signal to the downforce actuator to adjust the downforce based at least partially on an output from the downforce sensor.

Clause 3. The row unit of clause 2, wherein the controller is programmed to control the downforce adjustment mechanism to adjust a downforce on the frame by comparing a stored downforce target value to the output from the downforce sensor.

Clause 4. The row unit of clause 2, further comprising an electrical connector for establishing communication between the downforce sensor and the controller, wherein the electrical connector is supported by the second piece of the multi-piece body.

Clause 5. The row unit of clause 1, wherein the downforce sensor is a load cell including at least one strain gauge positioned in a receptacle of the downforce sensor housing.

Clause 6. The row unit of clause 1, wherein the stop is a rocker pivotably supported on the depth stop assembly and presenting two discrete stop surfaces, one of which is positioned to contact the gauge wheel arm supporting the gauge wheel and the other of which is positioned to contact a second gauge wheel arm supporting a second gauge wheel.

Clause 7. The row unit of clause 1, wherein the downforce sensor is offset from the stop and positioned on an opposite side of the pivot from the stop.

Clause 8. The row unit of clause 1, wherein the handle is slidably received by the first piece of the multi-piece body to define a handle axis, and wherein the downforce sensor extends parallel to the handle axis at a position alongside the handle.

Clause 9. The row unit of clause 8, wherein the downforce sensor is a load cell including at least one strain gauge oriented to measure perpendicular to the handle axis.

Clause 10. A row unit for a seeding machine operable to plant seeds into soil. The row unit includes a frame, a gauge wheel operable to engage the soil and support the frame via a gauge wheel arm connected between the gauge wheel and the frame, and a seed dispenser supported by the frame and operable to dispense seeds into the soil. The gauge wheel is supported by the frame via a gauge wheel arm. A depth stop assembly includes a stop setting an upward travel limit of the gauge wheel with respect to the frame, and a handle that is lockable and releasable to move the stop to select among a plurality of seeding depths. A pivot joins the depth stop assembly to the frame. A downforce actuator is operable to generate a variable amount of downforce to be applied through the gauge wheel arm and the gauge wheel to the soil. A downforce sensor is provided by a load cell including at least one strain gauge. The load cell is offset from the stop and positioned on an opposite side of the pivot from the stop.

Clause 11. The row unit of clause 10, wherein the stop is a rocker pivotably supported on the depth stop assembly and presenting two discrete stop surfaces, one of which is positioned to contact the gauge wheel arm supporting the gauge wheel and the other of which is positioned to contact a second gauge wheel arm supporting a second gauge wheel.

Clause 12. The row unit of clause 10, further comprising a controller programmed to output a control signal to the downforce actuator to adjust the downforce based at least partially on an output from the downforce sensor.

Clause 13. The row unit of clause 12, wherein the controller is programmed to control the downforce adjustment mechanism to adjust a downforce on the frame by comparing a stored downforce target value to the output from the downforce sensor.

Clause 14. The row unit of clause 12, further comprising an electrical connector for establishing communication between the downforce sensor and the controller, wherein the depth stop assembly includes a multi-piece body, and wherein the electrical connector and the handle are supported by separate pieces of the multi-piece body.

Clause 15. The row unit of clause 10, wherein the depth stop assembly includes a multi-piece body having a first piece receiving the handle, and a second piece defining the pivot joining the depth stop assembly to the frame.

Clause 16. The row unit of clause 18, wherein the first and second pieces of the multi-piece body are separate from each other and connected by fixing of the downforce sensor therebetween.

Clause 17. The row unit of clause 15, wherein the handle is slidably received by a body of the depth stop assembly to define a handle axis, and wherein the downforce sensor extends parallel to the handle axis at a position alongside the handle.

Clause 18. The row unit of clause 17, wherein the at least one strain gauge is oriented to measure perpendicular to the handle axis.

Clause 19. A seeding row unit depth stop assembly including a stop, a handle, a and a multi-piece body. The stop presents a surface positioned to set an upward travel limit of a gauge wheel of the row unit. The handle is movable between locked and released positions, the depth stop assembly having a pivot for moving among a plurality of seeding depths when the handle is in the released position. The multi-piece body has a first piece receiving the handle, and a second piece separate from the first piece, the second piece defining the pivot. A downforce sensor is incorporated into the depth stop assembly and movable therewith. The first piece forms a housing of the downforce sensor. The downforce sensor is offset from the stop and positioned on an opposite side of the pivot from the stop.

Clause 20. The seeding row unit depth stop assembly of clause 19, wherein the handle is slidably received by the first piece of the multi-piece body to define a handle axis, and wherein the downforce sensor extends parallel to the handle axis at a position alongside the handle, and wherein the downforce sensor is a load cell including a strain gauge oriented to measure perpendicular to the handle axis, the strain gauge positioned within a receptacle of the downforce sensor housing.

Any of the above referenced aspects of the disclosure can be combined with any one or more of the above referenced aspects of the disclosure.

Various features and advantages of the disclosure are set forth in the following claims.

What is claimed is:

1. A row unit for a seeding machine operable to plant seeds into soil, the row unit comprising:
a frame;
a gauge wheel operable to engage the soil and support the frame via a gauge wheel arm connected between the gauge wheel and the frame;
a seed dispenser supported by the frame and operable to dispense seeds into the soil;
a depth stop assembly including a stop setting an upward travel limit of the gauge wheel with respect to the frame, and a handle that is lockable and releasable to move the stop to select among a plurality of seeding depths;
a pivot joining the depth stop assembly to the frame;
a downforce actuator operable to generate a variable amount of downforce to be applied through the gauge wheel arm and the gauge wheel to the soil; and
a downforce sensor provided by a load cell including at least one strain gauge, wherein the load cell is offset from the stop and positioned on an opposite side of the pivot from the stop.

2. The row unit of claim 1, wherein the stop is a rocker pivotably supported on the depth stop assembly and presenting two discrete stop surfaces, one of which is positioned to contact the gauge wheel arm supporting the gauge wheel and the other of which is positioned to contact a second gauge wheel arm supporting a second gauge wheel.

3. The row unit of claim 1, further comprising a controller programmed to output a control signal to the downforce actuator to adjust the downforce based at least partially on an output from the downforce sensor.

4. The row unit of claim 3, wherein the controller is programmed to control the downforce adjustment mechanism to adjust a downforce on the frame by comparing a stored downforce target value to the output from the downforce sensor.

5. The row unit of claim 3, further comprising an electrical connector for establishing communication between the downforce sensor and the controller, wherein the depth stop assembly includes a multi-piece body, and wherein the electrical connector and the handle are supported by separate pieces of the multi-piece body.

6. The row unit of claim 1, wherein the depth stop assembly includes a multi-piece body having a first piece receiving the handle, and a second piece defining the pivot joining the depth stop assembly to the frame.

7. The row unit of claim 6, wherein the first and second pieces of the multi-piece body are separate from each other, the downforce sensor being coupled therebetween.

8. The row unit of claim 6, wherein the handle is slidably received by a body of the depth stop assembly to define a handle axis, and wherein the downforce sensor extends parallel to the handle axis at a position alongside the handle.

9. The row unit of claim 8, wherein the at least one strain gauge is oriented to measure perpendicular to the handle axis.

10. The row unit of claim 1, wherein the downforce sensor is incorporated into the depth stop assembly and movable therewith.

11. The row unit of claim 10, wherein the depth stop assembly includes a multi-piece body having a first piece receiving the handle, and a second piece, wherein the second piece defines the pivot joining the depth stop assembly to the frame.

12. The row unit of claim 11, wherein the first piece of the multi-piece body includes a handle-receiving receptacle portion, a fastening portion for fastening to the second piece of the multi-piece body adjacent the pivot, and a portion between the handle-receiving receptacle portion and the fastening portion forming a housing of the downforce sensor.

13. The row unit of claim 11, wherein the at least one strain gauge is positioned in a receptacle of the downforce sensor housing.

14. A seeding row unit depth stop assembly comprising:
a stop presenting a surface positioned to set an upward travel limit of a gauge wheel of the row unit;
a handle movable between locked and released positions, the depth stop assembly having a pivot for moving among a plurality of seeding depths when the handle is in the released position;
a multi-piece body having a first piece receiving the handle, and a second piece separate from the first piece, the second piece defining the pivot; and
a downforce sensor incorporated into the depth stop assembly and movable therewith,
wherein the first piece forms a housing of the downforce sensor, and
wherein the downforce sensor is offset from the stop and positioned on an opposite side of the pivot from the stop.

15. The seeding row unit depth stop assembly of claim 14, wherein the handle is slidably received by the first piece of the multi-piece body to define a handle axis, and wherein the downforce sensor extends parallel to the handle axis at a position alongside the handle, and wherein the downforce sensor is a load cell including a strain gauge oriented to measure perpendicular to the handle axis, the strain gauge positioned within a receptacle of the downforce sensor housing.

16. The seeding row unit depth stop assembly of claim 14, further comprising an electrical connector for establishing communication between the downforce sensor and a controller, wherein the electrical connector is supported by the second piece of the multi-piece body.

17. The seeding row unit depth stop assembly of claim 14, wherein the stop is a rocker pivotably supported at a first end of the depth stop assembly, wherein the handle is handle is located at a second end opposite the first end.

18. The seeding row unit depth stop assembly of claim 17, wherein the rocker includes two discrete stop surfaces, each of the two discrete stop surfaces configured to contact a respective gauge wheel arm.

19. The seeding row unit depth stop assembly of claim 14, wherein the downforce sensor is a load cell including a strain gauge positioned within a receptacle of the downforce sensor housing.

20. The seeding row unit depth stop assembly of claim 14, wherein the handle is biased to the locked position by a biasing member.

* * * * *